United States Patent
Celik et al.

(10) Patent No.: US 11,257,114 B2
(45) Date of Patent: Feb. 22, 2022

(54) AUTOMATIC AFTERCALL DIRECTORY AND PHONEBOOK ENTRY ADVERTISING

(71) Applicant: OnePIN, Inc., Westborough, MA (US)

(72) Inventors: Feyzi Celik, Hopkinton, MA (US); Marcin Nowak, Westborough, MA (US)

(73) Assignee: OnePIN, Inc., Westborough, MA (US)

( * ) Notice: Subject to any disclaimer, the term of this patent is extended or adjusted under 35 U.S.C. 154(b) by 0 days.

(21) Appl. No.: 17/022,445

(22) Filed: Sep. 16, 2020

(65) Prior Publication Data

US 2020/0410533 A1 Dec. 31, 2020

Related U.S. Application Data

(63) Continuation of application No. 16/658,094, filed on Oct. 20, 2019, now Pat. No. 10,803,484, which is a
(Continued)

(51) Int. Cl.
*H04L 29/06* (2006.01)
*G06Q 30/02* (2012.01)
(Continued)

(52) U.S. Cl.
CPC ......... *G06Q 30/0251* (2013.01); *G06F 9/542* (2013.01); *G06F 16/972* (2019.01);
(Continued)

(58) Field of Classification Search
CPC ......... H04M 1/274516; H04M 3/4931; H04M 3/42059; H04M 3/42102; G06Q 30/0267; G06Q 30/0203; H04W 4/14
(Continued)

(56) References Cited

U.S. PATENT DOCUMENTS

| | | | |
|---|---|---|---|
| 6,628,770 B1 | 9/2003 | Jain et al. | |
| 7,924,989 B1 * | 4/2011 | Cooper | H04M 3/5191 379/93.09 |

(Continued)

FOREIGN PATENT DOCUMENTS

| | | |
|---|---|---|
| WO | WO2009/023591 | 2/2009 |
| WO | 2012047273 A1 | 4/2012 |

(Continued)

OTHER PUBLICATIONS

International Search Report and Written Opinion, dated May 1, 2015, International Application No. PCTUS2015/010860, filed Jan. 9, 2015, 17 pages.
International Search Report and Written Opinion, dated Jun. 3, 2016, International Application No. PCT/US2016/013112, filed Jan. 12, 2016., 15 pages.
International Search Report and Written Opinion, dated Aug. 11, 2016, International Application No. PCT/US2016/30634, filed May 4, 2016, 15 pages.

(Continued)

*Primary Examiner* — Marcos Batista
(74) *Attorney, Agent, or Firm* — Giordano Law LLC; David A. Giordano

(57) ABSTRACT

This disclosure provides methods, services, and platforms that automatically prompt mobile phone users to add contact information to their phone book after a triggering event such as calling a phone number. The methods, services, and platforms allow mobile network operators to provide a service that allows businesses to potentially have their numbers added to the phonebook of a mobile phone after a disconnected call.

11 Claims, 10 Drawing Sheets

Related U.S. Application Data continuation of application No. 15/560,118, filed as application No. PCT/US2016/030612 on May 3, 2016, now Pat. No. 10,475,069.

(60) Provisional application No. 62/156,723, filed on May 4, 2015.

(51) Int. Cl.

| | |
|---|---|
| *H04M 15/00* | (2006.01) |
| *H04M 7/00* | (2006.01) |
| *H04M 1/2757* | (2020.01) |
| *H04M 1/72406* | (2021.01) |
| *H04M 1/72448* | (2021.01) |
| *H04M 3/42* | (2006.01) |
| *H04M 3/493* | (2006.01) |
| *H04W 4/14* | (2009.01) |
| *G06Q 30/00* | (2012.01) |
| *G06Q 50/00* | (2012.01) |
| *H04W 8/18* | (2009.01) |
| *H04W 8/26* | (2009.01) |
| *G06F 16/958* | (2019.01) |
| *G06F 9/54* | (2006.01) |
| *H04W 4/60* | (2018.01) |
| *H04W 4/16* | (2009.01) |
| *H04W 4/21* | (2018.01) |
| *H04M 1/72445* | (2021.01) |
| *H04W 4/00* | (2018.01) |
| *G06F 16/955* | (2019.01) |

(52) U.S. Cl.
CPC ......... *G06Q 30/01* (2013.01); *G06Q 30/0201* (2013.01); *G06Q 30/0203* (2013.01); *G06Q 30/0207* (2013.01); *G06Q 30/0245* (2013.01); *G06Q 30/0267* (2013.01); *G06Q 50/01* (2013.01); *H04M 1/2757* (2020.01); *H04M 1/72406* (2021.01); *H04M 1/72448* (2021.01); *H04M 3/42059* (2013.01); *H04M 3/42102* (2013.01); *H04M 3/42153* (2013.01); *H04M 3/42195* (2013.01); *H04M 3/42357* (2013.01); *H04M 3/42365* (2013.01); *H04M 3/4931* (2013.01); *H04M 7/0042* (2013.01); *H04M 15/58* (2013.01); *H04M 15/62* (2013.01); *H04M 15/705* (2013.01); *H04M 15/735* (2013.01); *H04M 15/7556* (2013.01); *H04M 15/80* (2013.01); *H04M 15/84* (2013.01); *H04M 15/844* (2013.01); *H04M 15/848* (2013.01); *H04M 15/852* (2013.01); *H04M 15/856* (2013.01); *H04W 4/14* (2013.01); *H04W 4/16* (2013.01); *H04W 4/60* (2018.02); *H04W 8/18* (2013.01); *H04W 8/26* (2013.01); *G06F 16/955* (2019.01); *G06Q 30/016* (2013.01); *H04M 1/72445* (2021.01); *H04M 2203/651* (2013.01); *H04M 2203/655* (2013.01); *H04M 2215/8158* (2013.01); *H04W 4/00* (2013.01); *H04W 4/21* (2018.02)

(58) Field of Classification Search
USPC ........................................ 455/414.3; 370/338
See application file for complete search history.

(56) References Cited

U.S. PATENT DOCUMENTS

| | | |
|---|---|---|
| 8,073,460 B1 | 12/2011 | Scofield et al. |
| 8,175,921 B1 | 5/2012 | Kopra |
| 8,249,627 B2 | 8/2012 | Olincy |
| 8,515,803 B2 | 8/2013 | Meyer et al. |
| 8,712,371 B2 | 4/2014 | Baker et al. |
| 8,934,876 B1 | 1/2015 | Cohen |
| 8,971,860 B1 | 3/2015 | Olincy |
| 8,989,712 B2 | 3/2015 | Wentker et al. |
| 10,540,693 B1 | 1/2020 | Monsowitz et al. |
| 2002/0159387 A1 | 10/2002 | Allison et al. |
| 2003/0065778 A1 | 4/2003 | Malik |
| 2004/0252816 A1 | 12/2004 | Nicolas |
| 2005/0064879 A1 | 3/2005 | McAvoy |
| 2005/0186939 A1 | 8/2005 | Barnea et al. |
| 2005/0233733 A1 | 10/2005 | Roundtree et al. |
| 2005/0289095 A1 | 12/2005 | Ruahala et al. |
| 2006/0271425 A1 | 11/2006 | Goodman |
| 2006/0285661 A1 | 12/2006 | Patel et al. |
| 2007/0047523 A1 | 3/2007 | Jiang |
| 2007/0055995 A1 | 3/2007 | Jiang |
| 2007/0061197 A1 | 3/2007 | Ramer |
| 2007/0106698 A1 | 5/2007 | Elliott et al. |
| 2007/0111748 A1 | 5/2007 | Risbood |
| 2007/0281689 A1 | 12/2007 | Altman et al. |
| 2008/0037738 A1 | 2/2008 | Nolan et al. |
| 2008/0075249 A1 | 3/2008 | Zach et al. |
| 2008/0090597 A1 | 4/2008 | Celik et al. |
| 2008/0261635 A1 | 10/2008 | Samiri |
| 2008/0292080 A1* | 11/2008 | Quon ............... G06Q 10/109 379/201.02 |
| 2008/0318554 A1 | 12/2008 | Romppanen et al. |
| 2008/0318555 A1 | 12/2008 | Romppanen et al. |
| 2009/0207983 A1 | 8/2009 | Nour-Omid |
| 2009/0225972 A1 | 9/2009 | Kahn |
| 2009/0265220 A1 | 10/2009 | Bayraktar et al. |
| 2009/0270067 A1 | 10/2009 | Johnson |
| 2009/0280786 A1 | 11/2009 | Ziklik |
| 2009/0290701 A1 | 11/2009 | Portman et al. |
| 2009/0318122 A1 | 12/2009 | White et al. |
| 2010/0100387 A1 | 4/2010 | Kuiken et al. |
| 2010/0161506 A1 | 6/2010 | Bosenick et al. |
| 2010/0198696 A1 | 8/2010 | Deshpande |
| 2010/0325221 A1 | 12/2010 | Cohen et al. |
| 2011/0029380 A1 | 2/2011 | Moukas et al. |
| 2011/0054920 A1 | 3/2011 | Phillips et al. |
| 2011/0076989 A1 | 3/2011 | Lynch |
| 2011/0119126 A1 | 5/2011 | Park et al. |
| 2011/0131421 A1 | 6/2011 | Jogand-Coulomb et al. |
| 2011/0151838 A1 | 6/2011 | Olincy |
| 2011/0151852 A1 | 6/2011 | Olincy |
| 2011/0287746 A1 | 11/2011 | Gopinath et al. |
| 2012/0057689 A1 | 3/2012 | Martin |
| 2012/0101989 A1 | 4/2012 | Ring et al. |
| 2012/0166271 A1 | 6/2012 | Wofford et al. |
| 2012/0238251 A1 | 9/2012 | Lee et al. |
| 2012/0303455 A1 | 11/2012 | Busch |
| 2012/0315880 A1 | 12/2012 | Peitrow et al. |
| 2012/0316992 A1 | 12/2012 | Oborne et al. |
| 2013/0060703 A1 | 3/2013 | Dala et al. |
| 2013/0086618 A1 | 4/2013 | Klein et al. |
| 2013/0115872 A1 | 5/2013 | Huang et al. |
| 2013/0130661 A1 | 5/2013 | Berner et al. |
| 2013/0144674 A1 | 6/2013 | Kim et al. |
| 2013/0204704 A1 | 8/2013 | Ross et al. |
| 2013/0217360 A1 | 8/2013 | Dakin et al. |
| 2013/0238706 A1 | 9/2013 | Desai |
| 2013/0290820 A1 | 10/2013 | Dhanani |
| 2013/0343543 A1 | 12/2013 | Blaisdell et al. |
| 2014/0007214 A1 | 1/2014 | Qureshi et al. |
| 2014/0024361 A1 | 1/2014 | Poon et al. |
| 2014/0026069 A1 | 1/2014 | Dennis |
| 2014/0057610 A1 | 2/2014 | Olincy |
| 2014/0156386 A1 | 6/2014 | Williams |
| 2014/0161249 A1 | 6/2014 | Tolksdorf |
| 2014/0188612 A1 | 7/2014 | Chou et al. |
| 2014/0229238 A1 | 8/2014 | Meyer et al. |
| 2014/0229277 A1 | 8/2014 | Khambete |
| 2014/0257985 A1 | 9/2014 | Gibson et al. |
| 2014/0304068 A1 | 10/2014 | Weinblatt |
| 2014/0329514 A1 | 11/2014 | Meriaz Yoram |
| 2014/0329565 A1 | 11/2014 | Mannix et al. |
| 2015/0019307 A1 | 1/2015 | Girard et al. |

(56) References Cited

U.S. PATENT DOCUMENTS

| | | |
|---|---|---|
| 2015/0038120 A1 | 2/2015 | Larkin |
| 2015/0071427 A1 | 3/2015 | Kelley et al. |
| 2015/0073891 A1 | 3/2015 | Dauneria |
| 2015/0149301 A1 | 5/2015 | Dow |
| 2015/0180733 A1 | 6/2015 | Krutzler et al. |
| 2015/0201313 A1 | 7/2015 | Celik et al. |
| 2015/0256672 A1 | 9/2015 | Collart |
| 2015/0327042 A1 | 11/2015 | Kempf et al. |
| 2016/0048937 A1 | 2/2016 | Mathura et al. |
| 2016/0063528 A1 | 3/2016 | Zhang |
| 2016/0086160 A1 | 3/2016 | Desai et al. |
| 2017/0228789 A1 | 8/2017 | Macgillivray |
| 2018/0007198 A1 | 1/2018 | Rabra et al. |
| 2018/0032997 A1 | 2/2018 | Gordon et al. |

FOREIGN PATENT DOCUMENTS

| | | |
|---|---|---|
| WO | 2012047273 A9 | 4/2012 |
| WO | WO2014/049322 | 4/2014 |

OTHER PUBLICATIONS

International Search Report and Written Opinion, dated Aug. 11, 2016, International Application No. PCT/US2016/30664, filed May 4, 2016, 15 pages.

International Search Report and Written Opinion, dated Aug. 12, 2016, International Application No. PCT/US2016/30612, filed May 3, 2016, 19 pages.

International Search Report and Written Opinion, dated Aug. 12, 2016, International Application No. PCT/US2016/30699, filed May 4, 2016, 15 pages.

International Search Report and Written Opinion, dated Sep. 16, 2016, International Application No. PCT/US2016/30764, filed May 4, 2016, 13 pages.

International Search Report and Written Opinion, dated Aug. 18, 2016, International Application No. PCT/US2016/30859, filed May 4, 2016, 12 pages.

International Search Report and Written Opinion, dated Jul. 25, 2016, International Application No. PCT/US2016/21540, filed Mar. 9, 2016, 17 pages.

* cited by examiner

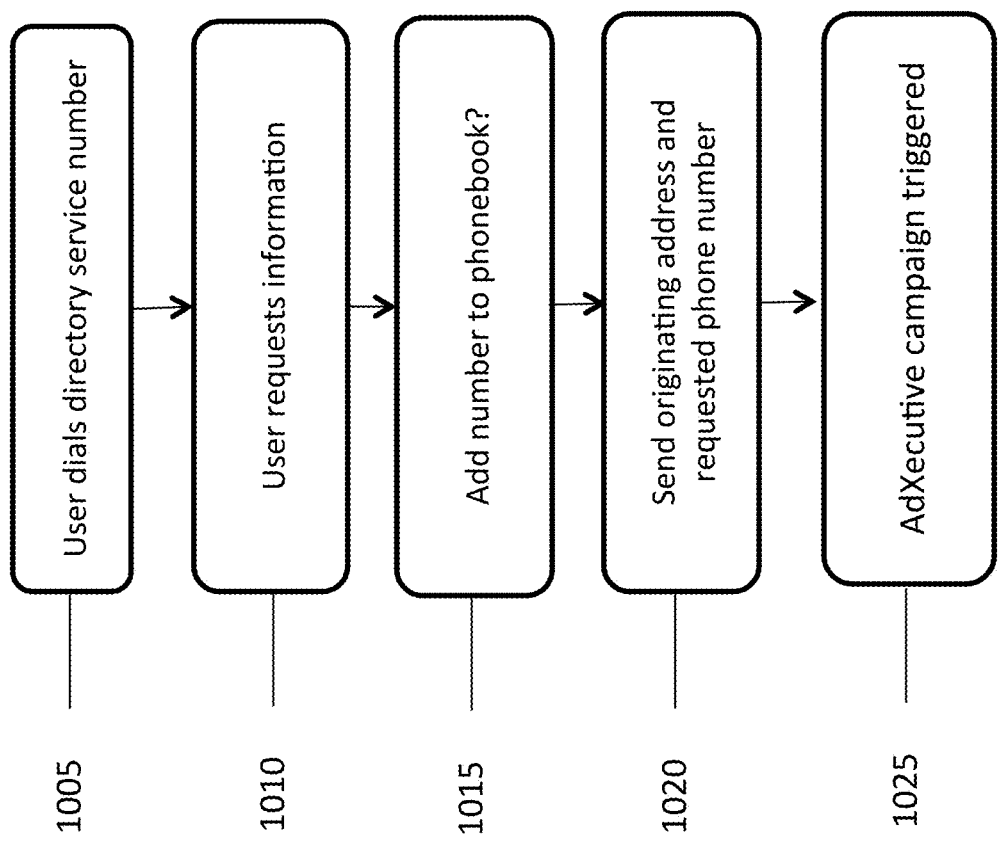

AUTOMATIC AFTERCALL DIRECTORY AND PHONEBOOK ENTRY ADVERTISING

CROSS-REFERENCE TO RELATED APPLICATIONS

This application is a continuation application of U.S. application Ser. No. 16/658,094, filed Oct. 20, 2019, now U.S. Pat. No. 10,803,484, which application was a continuation of U.S. application Ser. No. 15/560,118, filed Sep. 20, 2017, now U.S. Pat. No. 10,475,069, which application was a national stage entry of PCT/US16/30612, filed May 3, 2016, which application claimed priority to U.S. Provisional Patent Application No. 62/156,723, filed May 4, 2015. The entire contents of those applications are incorporated herein by reference.

BACKGROUND

Advertising has long been an effective way to communicate with existing customers and to attract new consumers. With the advent of mobile phone technology, companies and big brands have begun to redistribute advertising dollars traditionally spent on print, TV, and internet in an effort to reach audiences via a more personal mechanism: specifically, via a mobile device, often a device that is always with consumers. For mobile consumers with smartphones able to download applications, many brands opt to promote products and services within an application, often referred to as in-app advertising. These could consist of banner ads displayed at the bottom or side of the screen, or integrated within the application itself. Push text messaging is another mechanism commonly used in the mobile advertising realm. With this method, consumers can sign-up to receive push messages from specific brands. In some scenarios a consumer may choose to receive advertisements from a wide variety of companies in exchange for discounted cell service voice, SMS, and data usage. In some regions, push SMS marketing is heavily used regardless of whether consumers have explicitly opted-in to received messages from companies or brands. In each case, companies are limited in the amount of information that can be provided to mobile consumers, and often SMS advertising messages are ignored or lost in an array of other text messages received. Even if a significant sale or coupon is provided, unless the advertisement is actionable, it is generally forgotten thereby lessening the effectiveness of using mobile as a personalized communication vehicle for the brand. In some regions, mobile consumers who have been inundated with SMS marketing messages have become immune to the messages and are essentially conditioned to ignore texts arriving in their inbox. For mobile marketing to be effective, a truly personalized approach must be taken in order to deliver relevant information to consumers at the right time.

SUMMARY

In one aspect, this disclosure is directed to a computer-implemented method for automatically prompting a user to add contact information to the user's mobile device after a call has disconnected. The method comprises: receiving, at a server, an indication that a call connected from the user's mobile device to a first phone number has disconnected; determining, at the server, whether the first phone number matches a second phone number stored in a database connected to the server; requesting user information when the first phone number matches a second phone number stored in the database; receiving, at the server, user information, wherein the user information comprises the user's Mobile Station International Subscriber Directory Number (MSISDN); preparing an advertising message comprising contact information comprising the first phone number and an actionable option to add the contact information to the phonebook of the mobile device; and sending the advertising message to the user's mobile device. The term "phonebook" is called "Contacts" for some mobile devices. As used herein, the term "phonebook is meant to encompass all phonebooks, contacts, and similar applications used for storing and organizing contact information on mobile devices.

In some embodiments, the method further comprises receiving at the server an indication that the user opted to add the contact information or an indication that the user declined to add the contact information. In further embodiments, the method also comprises storing the received indication and the MSISDN of the mobile device.

The platforms and methods of this disclosure can also provide updates to mobile devices that have added contact information to their phone book. In some embodiments, the method comprises: receiving, at the server, an update to the contact information, wherein the update comprises one or more of a web address, a street address, a social network ID, a photo, a logo, mapping coordinates, a second phone number, a fax number, an email address, a photo, a video, or a description of the owner's business; preparing a communication comprising the update to the contact information and an actionable response option; and sending the communication to the mobile device wherein the communication is sent to the mobile device if the indication indicated that the user opted to add the contact information. In some embodiments, the method further comprises receiving, at the server, an second indication indicating whether the user opted to add the update to the contact information.

In some embodiments, the user information further comprises the destination address. In some embodiments, the user information further comprises the date and time of the call.

In some embodiments, the method comprises determining whether the matched phone number has an existing advertising campaign. This helps to make sure an advertising campaign is still active or relevant.

In some embodiments, the method also comprises determining whether the user has opted out of receiving an advertising message, the determining step comprising comparing the MSISDN of the mobile device to a database connected to the server, wherein the database comprising MSISDNs that have opted out of receiving an advertising message.

In some embodiments, the advertising message is formatted to be opened by an application on the user's mobile device. When the message is received on the mobile device, it triggers the launch of the application.

In some embodiments, the advertising message is formatted as an SMS message.

In some embodiments, the method further comprises determining the number of advertising messages the MSISDN has received. In still further embodiments, the method also comprises determining whether the number of advertising messages the MSISDN has received exceeds a limit. In certain embodiments, the method also comprises determining the number of advertising messages the user has received in a specific time period. In yet further embodiments, the method comprises determining whether the number of advertising messages the MSISDN has received exceeds a limit.

In certain embodiments, the user information further comprises the type of mobile device.

In some embodiments, the contact information further comprises the name of the owner of the phone number. In some embodiments, the contact information further comprises at least one of a web address, a street address, a social network ID, a photo, a logo, mapping coordinates, a second phone number, a fax number, an email address, a photo, a video, or a description of a business.

In another aspect, this disclosure provides a computer-implemented method for automatically prompting a user to add contact information to the user's mobile phone, the method comprising: receiving, at the processor in the mobile phone, an indication that a call connected between the mobile phone and a first phone number has disconnected; receiving at the mobile device an advertising message comprising an actionable option to add contact information to the mobile phone's phonebook, wherein the contact information comprises the first phone number; and displaying on the screen the advertising message.

In some embodiments, the method further comprises receiving, at the processor in the mobile phone, an indication that the user desires to add the contact information to the mobile phone's phonebook; and adding the contact information to the mobile phone's phonebook.

In certain embodiments, the method comprises playing an alert tone on the mobile device when the advertising message is displayed.

In some embodiments, the method further comprises receiving, at the processor of the mobile device, a second advertising message comprising an actionable option to add an update to the contact information, wherein the update comprises one of a web address, a street address, a social network ID, a photo, a logo, mapping coordinates, a second phone number, a fax number, an email address, a photo, a video, or a description of a business.

In certain embodiments, the method also comprises launching an application installed on the mobile phone, wherein the application causes the advertising message to be displayed. In some embodiments, the application causes the mobile phone to play a tone when the advertising message is displayed. In further embodiments, the application is installed on the SIM card. In still other embodiments, the application is installed on the operating system of the mobile phone.

In some embodiments, the contact information further comprises the name of the owner of the phone number. In certain embodiments, the contact information further comprises at least one of a web address, a street address, a social network ID, a photo, a logo, mapping coordinates, a second phone number, a fax number, an email address, a photo, a video, or a description of a business.

DESCRIPTION OF THE FIGURES

FIG. 10 is a flowchart illustrating the exemplary process of how an AdXecutive campaign can in conjunction with a Mobile Directory Service.

DETAILED DESCRIPTION

Figure 1:
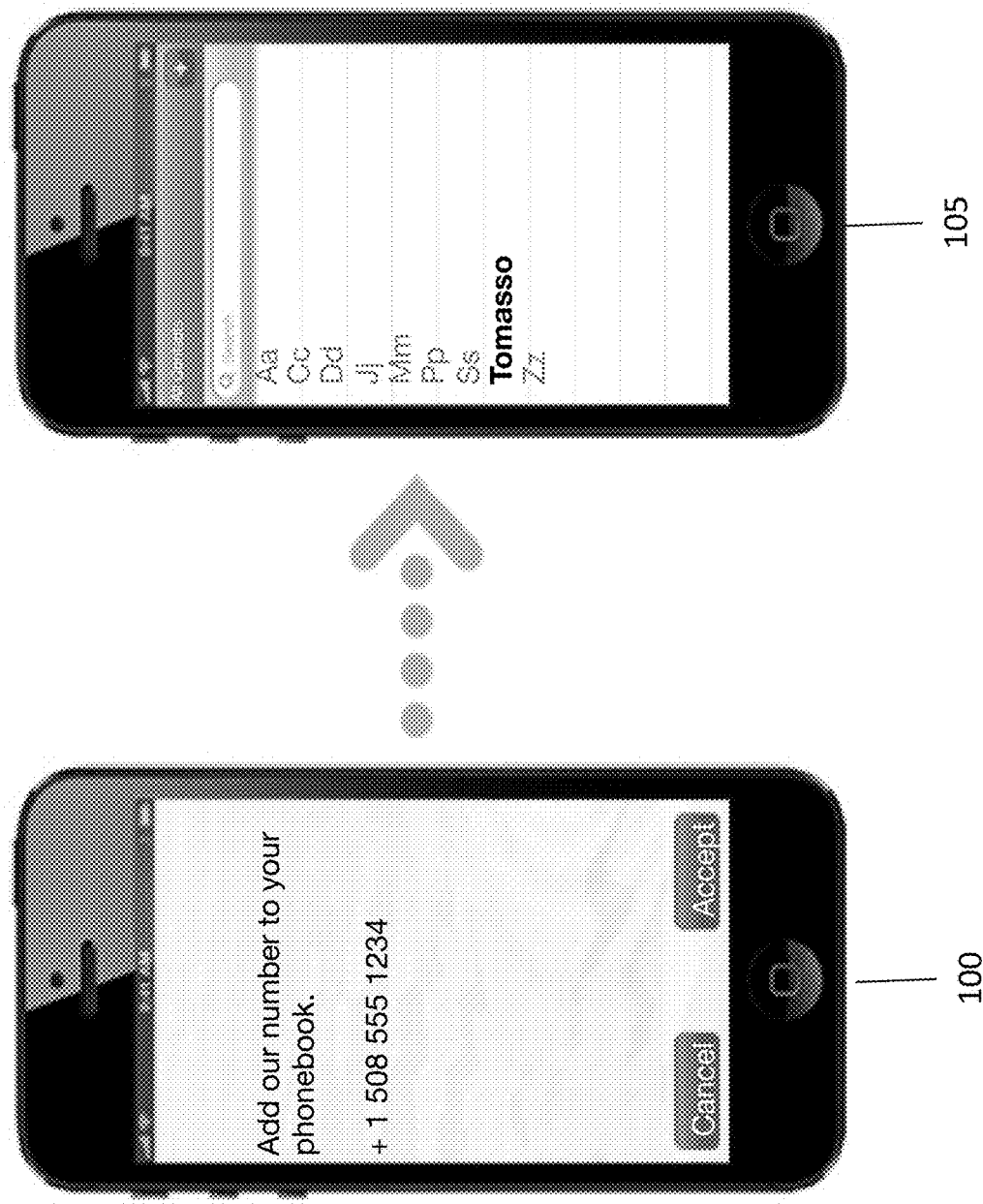
FIG. 1 is a graphical overview illustrating the user interface by which a user may add a phone number directly into his or her mobile phonebook via an interactive prompt.

This application provides aspects and embodiments of OnePIN's AdXecutive™ service. The term "AdXecutive" is used throughout this application to refer to multiple aspects and embodiments of the methods, applications, services, systems, and platforms disclosed herein. The name "AdXecutive" is not limited to any specific embodiment and can refer to multiple embodiments or individual embodiments. Furthermore, other names are also used to refer to embodiments described herein.

As used herein, the terms "a" and "an" mean one or more than one.

AdXecutive allows subscribers to add important phone numbers (such as airlines, hotels, restaurants, etc.) directly into their phonebooks with a click of a button after a phone call. This approach is very attractive to advertisers, and MNOs (Mobile Network Operators) are able to charge a higher "per-impression" rate for these mobile phonebook advertisements delivered using the AdXecutive platform. Thus, AdXecutive can be used to extend an MNO's mobile advertising revenues.

The systems and methods disclosed herein enable MNOs, enterprises, and small businesses to deepen their relationship with consumers after phone calls to the company. These calls could be to a business's customer service center, sales office, technical support line, reservations line, automated help line, or any other phone line associated with the business. Calls could be to mobile lines or fixed lines associated with the business.

For brands and businesses, AdXecutive is a unique way to remain relevant with mobile subscribers. The phonebook (or contact list) is the most commonly used application on a mobile consumer's device. It is the foundation for a mobile consumer's most valued communications—nearly all SMS messages and more than 85% of phone calls made are made to friends, family, colleagues, or businesses that are within a mobile subscriber's phonebook. If a brand or company, such as an airline, car service, restaurant, flower service, or hotel is able to reside within a mobile subscriber's phonebook, that company often becomes the de facto choice for consumers. Brands recognize that owning a piece of real estate in a consumer's phonebook is a valuable asset.

AdXecutive is cloud-based service that interacts with a client application residing on the phone—either as a downloadable application from an external site, within the device operating system, or within a SIM card.

AdXecutive automatically detects that a specific phone number for a business or enterprise was dialed by the mobile subscriber. At the end of the phone call, AdXecutive asks the mobile subscriber if he would like to add the business's phone number directly into his phonebook. If the user chooses "yes" the contact can be added via the AdXecutive service with a single click—without the subscriber having to type any information into his mobile phone.

AdXecutive is used with a mobile phone and any other device that can be configured to make phone calls. For example, tablets and other computers that include Skype or Google Voice can be utilized with the services.

The following example illustrates how an embodiment of AdXecutive works: Bob calls Lufthansa Airlines to make a reservation for a plane ticket. He makes the call from his mobile phone. Bob speaks with a customer service representative at Lufthansa, and books a ticket. He ends the call. After the phone call, Bob receives a message notification on his mobile phone. The message appears directly on his screen—and he can see the prompt even if his phone is in a locked screen mode. The message is not delivered to his SMS inbox where it may languish for days. It is an actionable, interactive screen displayed directly to Bob. He is asked if he would like to add the phone number for Lufthansa Airlines into his phonebook. The prompt appears automatically after his phone call. Bob selects "OK" and the AdXecutive client application on the mobile device automatically inserts the phone number into Bob's mobile phonebook.

In another embodiment, a silent communication is sent back to the server with Bob's selection, and with the TAC (Type Allocation Code) of his device. With the TAC of Bob's device, the platform knows what type of phone Bob has and can create a phonebook entry that is formatted specific to his device type. The phonebook entry is then sent back to Bob's device.

In either embodiment outlined above, the application can send a silent notification back to the cloud server with Bob's selection. The cloud is able to track the total number of mobile subscribers per enterprise brand (in this case Lufthansa) who have received phonebook add requests over a given date range. The cloud also tracks the total number of subscribers who have given a positive response requesting that the phone number be added, those who have given a negative response, and the total number of timeouts, meaning that the subscriber likely did not see the request.

In some embodiments, the AdXecutive platform includes a web interface that enables businesses, enterprises, and marketers, to log in, and define a campaign. Within the campaign event, businesses or mobile operators can enter all relevant information including, but not limited to, the target phone number(s) that will trigger the AdXecutive prompts when called and the timeframe during which a campaign will be relevant. Business phone numbers can be validated by the MNO and/or administrators of the platform to prevent inappropriate use.

The user interface specifics (i.e., the actual words mobile consumers will see) can be entered via the web interface. The business/enterprise is also able to specify the length of time (days or hours) the campaign should run, the days of the week when it should be executed, and times during the day when it is relevant (for example, 8 AM-10 PM). The business also has the opportunity to set a regional campaign, based on a calling party's area code. In this instance, the business can define a campaign where only customers in a specific geographic region (as determined by their mobile area code where applicable) are targeted.

In some embodiments, the AdXecutive cloud (server) is connected to a mobile network operator's call switch via an Application Programming Interface (API). Alternatively, in other embodiments, the cloud platform can also be connected to the mobile operator's billing platform via an API, depending on the operator's network structure, the operator's HLR, or other network infrastructure that determines when a specific phone number is dialed. When a designated campaign number is dialed (i.e., a business's phone number), the API informs the AdXecutive cloud platform. The business phone number and the mobile subscriber's phone number are both passed to the platform via the API, in addition to the date and time.

When the cloud server receives communications via the API, the business phone number is checked to determine which campaign should be executed (as there will be multiple campaigns for different businesses running on the platform at the same time). The platform also checks the caller's phone number to determine if the calling party has opted out from receiving advertisements for specific brands. The opt out process is explained in further detail below.

If the calling party is not on any of the opt-out blacklists, then an appropriate campaign message is prepared based on the configuration criteria and sent to the mobile subscriber. Here, this communication is described as an SMS which triggers a remote application on the calling party's mobile phone. This could be a binary SMS, standard text SMS, a specialized (flash, class 1) SMS, or a class 2 SMS which the handset passes to a SIM card within the device. Alternatively, communications can occur via MMS, email, USSD, or via other web-based communications channels between the mobile phone and the platform.

In some embodiments, when the message is received on the calling party's mobile device, the client application displays the prompt to the caller. The user is able to select a response (e.g., Yes/No), which is then sent back to the cloud via the application. Communication back to the cloud can be via a data channel, SMS, MMS, etc.

The above embodiments can also be implemented in a manner where a client application (either on the phone or on the SIM card) is not required. A USSD (Unstructured Supplementary Service Data) channel is opened and the communications between the mobile subscriber and the platform occur via USSD communications.

In addition to after-call techniques, campaigns can be conducted in an intelligent push manner. The AdXecutive cloud server is able to track calls that individual subscribers make to businesses. If a business would like to run a campaign at a later date, subscribers who have called that business in the past can be targeted. This makes the prompts to the mobile subscribers relevant, as a previous relationship with the company had already been established by the mobile consumer. Consumers targeted in this manner receive a prompt, similar to that outlined in the before mentioned embodiments. Subscribers receive a message asking them if they would like to add a business' phone number to their phonebook. The intelligent campaigns can be arranged to run at predefined dates and times, and for selected groups of subscribers in a regional area based on the subscriber's area code.

Each time the subscriber receives a message from the AdXecutive platform, he or she has the option not to reply. The service has the intelligence to count the number of rejections and, based thereon, can ask the subscriber if he or she would like to opt-out of the service if the service is not being used. The opt-out counters for the subscribers who have used the service and for the subscribers who have never used the service can be different. For example, if the mobile subscriber (calling party) has never replied to any AdXecutive prompts, an opt-out screen can be displayed for a set number of times he has cancelled out of the prompting screen. In this example, a counter can be set at "3" so that, for example, after 3 (three) times the subscriber chooses not to send a reply to the survey prompt question; the subscriber will be shown a screen to opt-out of the service). If the mobile subscriber has answered an AdXecutive prompt in the past, but has recently cancelled out of several new prompts, this opt-out counter can be set higher—for example to 6 (six), as this caller has exhibited past behavior indicating that he or she is willing to respond to prompts for specific companies in the right scenario.

The AdXecutive platform has the ability to track and store responses of all campaigns executed. In the event that a company, business, brand, or other entity that has previously executed a campaign via the platform changes or enhances any of its contact information, a targeted update can be sent to all subscribers who previously indicated they would like to add the business contact information into their mobile phonebooks. In one embodiment, this can be executed as a bulk campaign. The platform records the device type of all subscribers with the AdXecutive remote application. In the bulk campaign embodiment, the platform executes the campaign and sends the contact information in a format that provides the best user experience based on the device type of the subscriber.

In embodiments where the information was sent and the subscriber added the contact to his SIM phonebook, the server can create a command message which will update the contact information in the user's SIM phonebook automatically, without any user prompt. In this embodiment, a follow-up message could be sent to the subscriber outlining that a phonebook update for a specific business was made. In an alternative embodiment, a notification can be sent to the subscriber indicating that a particular business the user previously added into his phonebook is now offering an update. The user has the option to accept or reject the update.

Benefits of AdXecutive

The AdXecutive methods and systems disclosed herein provide numerous benefits for businesses/enterprises, MNOs, and subscribers. Some of those benefits include:

Benefits for Businesses
  Simplicity: Establishing campaigns is a simple and straightforward process.
  Wide Reach: Enterprises are able to collect customer feedback from a vast array of customers across multiple segment types. Especially in developing areas, this is key as many survey participants may not have access to a computer or landline phone or physical store location (i.e., typical ways in which customer feedback is traditionally collected). However, these customers do have mobile phones, and can be valuable participants in the feedback process.
  Unique Potential for Brands and MNOs: No other service in the market is able to unlock an advertising opportunity in the phonebook. Brands are able to extend their relationship with customers and make it easier for customers to interact (book tickets, make reservations, etc.). With a Directory Service type of approach, brands provide a unique value to their customers.
  Easy to Use: Subscribers can easily add valuable, relevant phone numbers to their phonebooks with a single click.

Benefits for Mobile Operators
  Revenue Generating Service: Mobile Network Operators (MNOs) are able to offer a differentiating service to their Business and Enterprise customers. Enterprises pay for valuable customer feedback, creating a significant revenue generator for MNOs, as each customer response represents a billed event.

Benefits for the Calling Party
  Relevance: Customers receive useful information for brands and businesses they routinely call.
  Interoperability: The services work across all mobile devices so subscribers have a similar experience regardless of what type of mobile device or tablet they are using.

AdXecutive Platform

FIG. 1 showcases the user interface a mobile consumer would see when the AdXecutive service triggers and displays a prompt to a subscriber after a phone call. In stage 100, which occurs immediately after a phone call to a business currently running an AdXecutive campaign ends, an interactive prompt displays, optionally accompanied by an alert tone on the mobile device.

The text displayed to the calling party is fully configurable by the company or business that was called. In the example in FIG. 1, a mobile user calls a restaurant to make a reservation. After the phone call, the user sees an automatic, interactive prompt on her handset directly on the screen.

In an embodiment where the mobile user interacts with the campaign message and chooses to add the available contact information into her phonebook, the contact will display along with other contacts as shown in stage 105.

Figure 2:
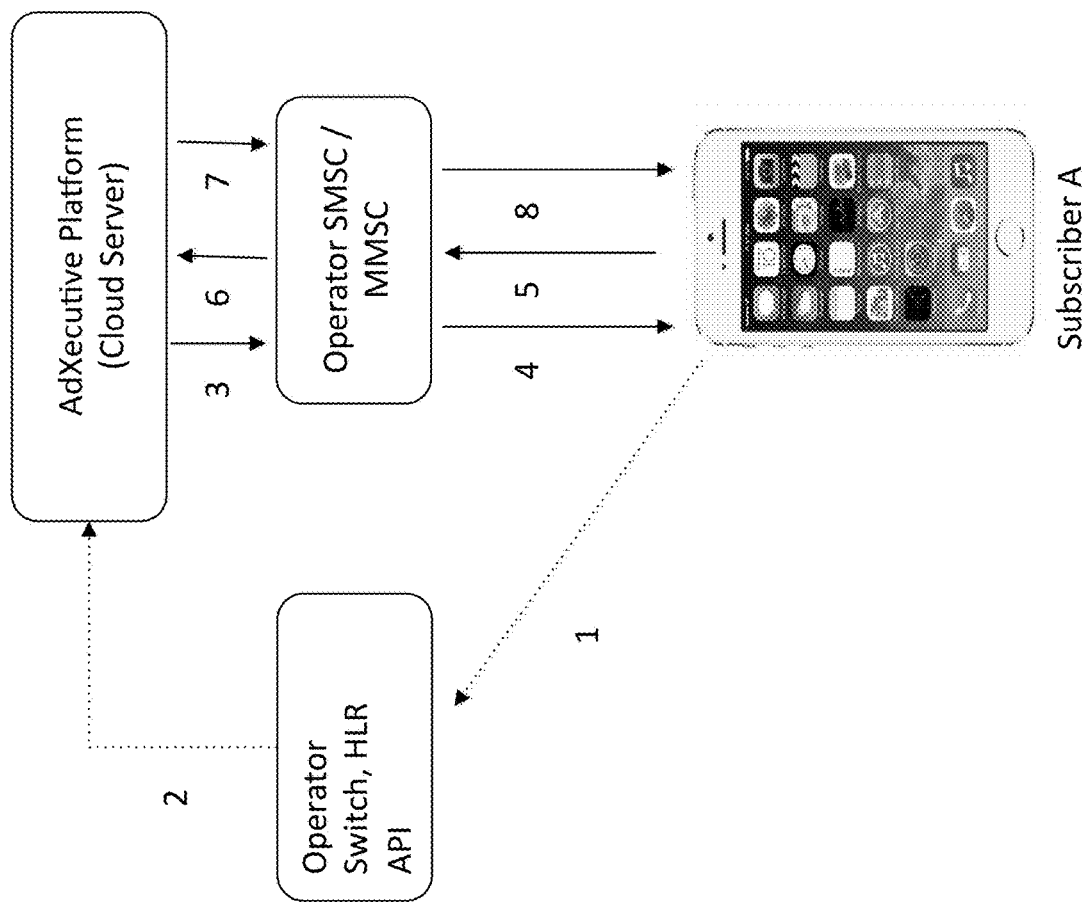
FIG. 2 is a flowchart illustrating the basic architecture of the AdXecutive platform.

FIG. 2 is a flowchart illustrating the basic architecture of the AdXecutive platform. In one embodiment, as depicted in FIG. 2, AdXecutive utilizes the following connectivity structure: Mobile Subscriber A calls a number defined in the AdXecutive target base ("1"). The Operator Switch or HLR (Home Location Registry) are in communication with the AdXecutive platform ("2"). This allows for the Mobile Operator Network to notify the AdXecutive platform when a specific target phone number is dialed. In some embodiments, a database or storage server comprising campaign trigger events, including, e.g., phone numbers called, calls placed from specific phone numbers, etc. In some embodiments, the database or storage server is part of the MNO network. In such embodiments, the MNO network notifies the AdXecutive server that a targeted phone number has been called or has placed a call. In some embodiments, the trigger event could also be navigation to or away from a specific web address on the mobile device. In some embodiments, the API provides the subscribers MSISDN and the called number. In such embodiments, the AdXecutive platform processes this information and determines which advertising campaign should be run. In some embodiments, the MNO network informs the AdXecutive server which advertising campaign should be triggered.

After a target phone number is dialed, and, subsequently, the required information necessary to trigger a campaign is passed to the AdXecutive platform via an API, the platform processes the information and prepares a campaign message to be sent to a mobile subscriber.

In one embodiment, the AdXecutive platform is connected to a Mobile Network Operator SMSC (Short Message Service Center) via an SMPP (Short Message Peer-to-Peer) connection ("3"). Other connection types in other embodiments are also possible. In some embodiments, the platform may also be connected to an MNO's MMSC (MultiMedia Message Service Center). The Operator SMSC forwards the AdXecutive campaign message to Subscriber A's device ("4").

The phonebook promotion appears on Subscriber A's device as exemplified in FIG. 1, at which point the subscriber selects his or her preferred option.

The AdXecutive remote application within Subscriber A's mobile device forwards the response to a designated short code at the Operator SMSC ("5"). The Operator SMSC receives and forwards the response to the AdXecutive platform (e.g., via a binary SMS message) ("6"). The platform parses the message and determines an appropriate response to Subscriber A based on Subscriber A's device type and interest in the campaign promotion.

In the instance where Subscriber A chose to add the contact information promoted via the AdXecutive service, the platform would send a message back to the subscriber in either a specially formatted vCard SMS, a binary SMS, or an MIMS. These messages would flow through the MNOs SMSC and MMSC respectively ("7"). The Operator SMSC forwards the contact information to the device user "(8)".

Figure 3:
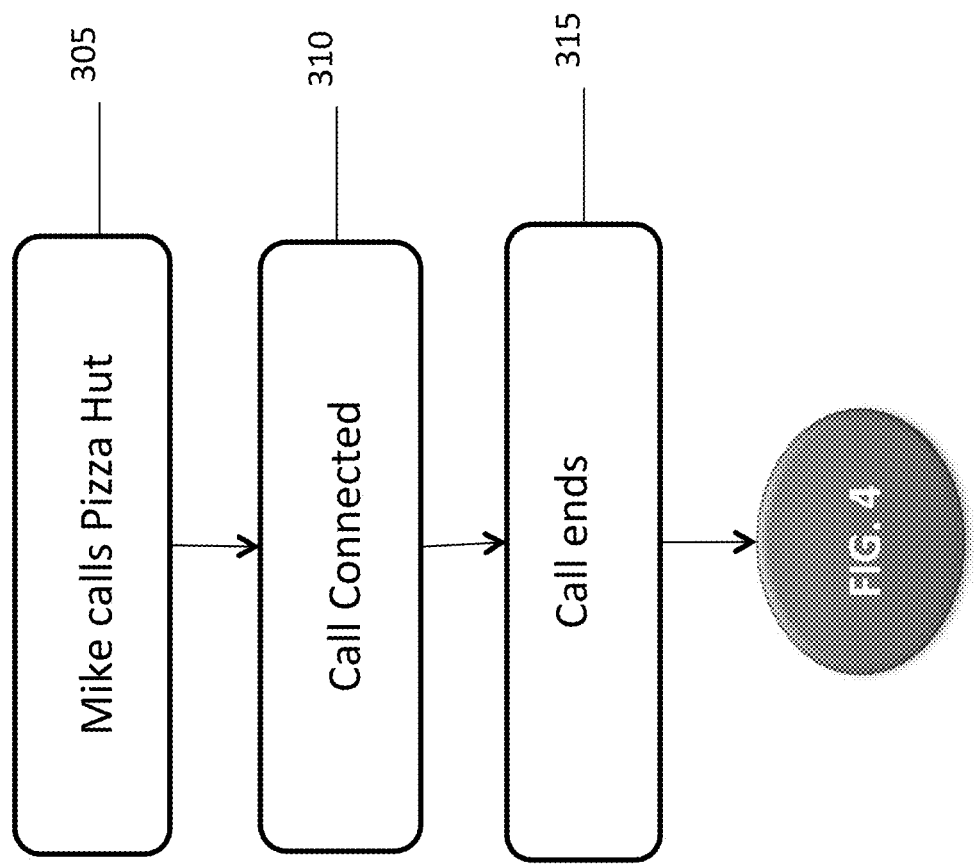
FIG. 3 is a flowchart illustrating the steps related to a phone call event that will lead to the eventual triggering of the AdXecutive service.

FIG. 3 is a flowchart illustrating the steps related to a phone call event that will lead to the eventual triggering of the AdXecutive service. In stage 305, Mike makes a call to a business using his mobile phone. In this example, the business is Pizza Hut, but he could be making a call to any type of business or individual party. In stage 310, the call connects. A connected call can have a multitude of scenarios. In this embodiment, Mike speaks with a live human when the call connects. In other embodiments, Mike may interact with an automated voice response system, or may connect to a recorded message or voice mail system. In all cases, the call will end as signified by stage 315. At this point, the call is disconnected and communications between the AdXecutive platform (server) and the Mobile Operator's Network continues, as outlined in FIG. 4.

Figure 4:
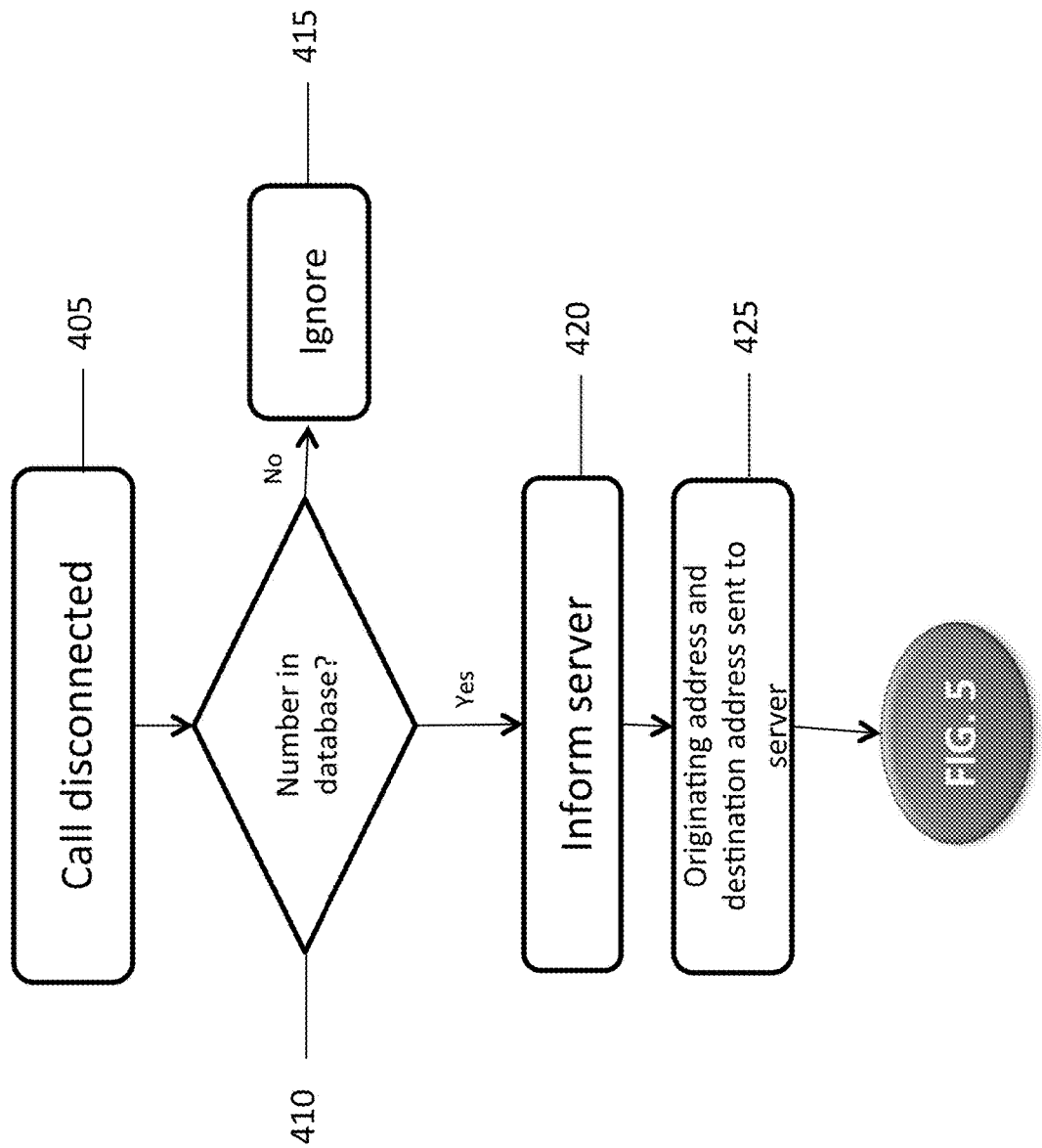
FIG. 4 is a flowchart illustrating the Mobile Operator Network as it would interact with the AdXecutive server platform.

FIG. 4 is a flowchart illustrating the interaction between the Mobile Operator network and the AdXecutive server platform. In stage 405, Mike's call is disconnected. The Call Disconnect is a formal event recognized by the Mobile Operator Network. This can be a caller initiated Call Disconnect, meaning Mike ended the call on his mobile device first. In some embodiments, the Call Disconnect may be a Network Originated Call Disconnect Event, meaning the called party terminates the call or the network is not able to maintain the call and the call drops.

When the call ends, the MNO Network will automatically check the phone number dialed to determine if it is a number with an AdXecutive campaign associated with it. In some embodiments, this information is stored within a database in the Mobile Operator's Network. In other embodiments, the information can be stored within the AdXecutive platform with regular communications between the MNO network and the AdXecutive platform via web services or APIs (Application Programming Interfaces). In some embodiments the MNO network informs the AdXecutive platform which campaign should be triggered. In other embodiments, the AdXecutive platform determines which campaign should be triggered based on the information received from the MNO network (e.g., the MSISDN, the called number, etc.). In some embodiments, the phone numbers associated with campaigns are stored on an application on the mobile device. The application on the mobile device can check to see if a called number is stored on the device. If the number matches a stored number, the application can trigger the campaign. In further embodiments, the MNO network notifies the AdXecutive server of each phone call placed and the AdXecutive server checks each phone number called or called from to see if a campaign should be triggered.

If the phone number Mike dialed in this embodiment does not have an AdXecutive campaign defined, then the flow ends as shown in stage 415, and no further processing continues. If the phone number called does have a campaign defined, then the MNO network informs the AdXecutive platform of the calling event as discussed herein beginning at stage 420. Information to execute the advertising campaign on the AdXecutive platform is passed from the MNO network to the platform. This information includes the calling party's mobile MSISDN (Mobile Station International Subscriber Directory Number), also known as Mike's mobile phone number. In this embodiment, Mike's mobile phone number is also known as the OA, or Originating Address. In some embodiments, the MNO network may also provide time and date to the AdXecutive platform.

The called phone number, referred to as the DA or Destination Address, is also sent to the AdXecutive platform. This number may be a mobile phone number dialed, an international number, a landline or fixed number, a 1-800 phone number, a 1-900 phone number, an abbreviated number such as those used for emergency services such as 911, a shortcode number often used in the mobile industry for Short Message Service (SMS) communications or any other number or address mechanism used for connecting two or more parties to communicate. The AdXecutive platform then continues processing, as outlined in FIG. 5.

Figure 5:
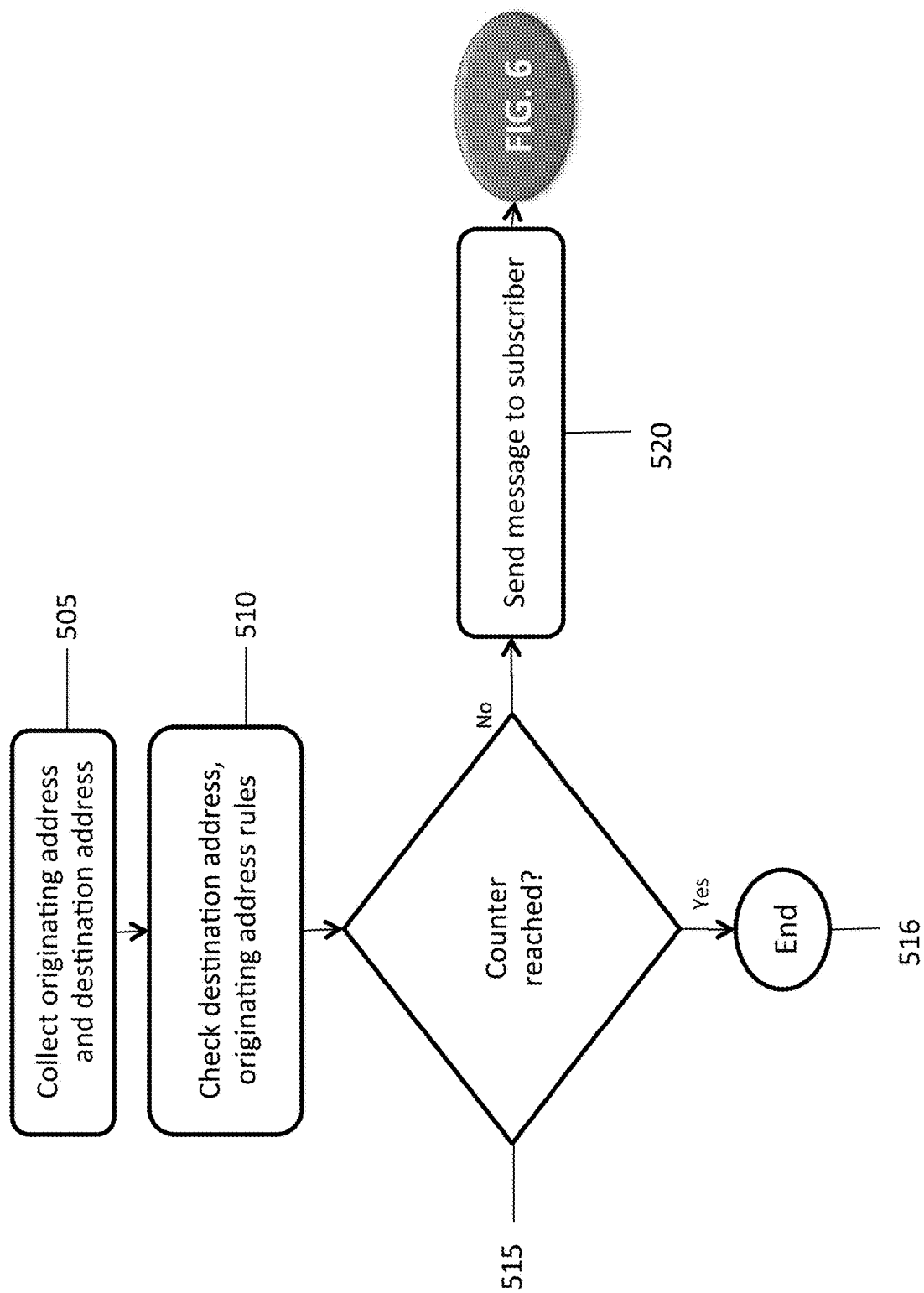
FIG. 5 is a flowchart illustrating the exemplary process of the logic the AdXecutive platform uses to determine if a campaign message should be sent to a specific targeted mobile subscriber.

FIG. 5 is a flowchart illustrating an exemplary embodiment of a process of the logic the AdXecutive platform uses to determine if a campaign message should be sent to a specific targeted mobile subscriber. In this embodiments, the AdXecutive platform receives the Origination Address, Destination Address, and, optionally, other information including date and time from the MNO network as shown in stage 505. In stage 510, the AdXecutive platform performs a check for the Destination Address (e.g., Pizza Hut) to determine if the campaign is still relevant and, optionally, if the date and time settings fall within preconfigured allowable ranges. The Originating Address, Mike's phone number, is also checked by the platform in stage 515. The platform checks to determine if Mike has opted out of receiving message notifications. In some embodiments, a mobile subscriber such as Mike may opt out of receiving any AdXecutive notification for any brand, company, or business called. In other embodiments, the platform and remote application residing within Mike's device are configured to allow Mike to manage which brands, businesses, and companies he would like to received AdXecutive notifications from after phone calls.

In stage 515, the platform also checks to ensure that Mike has not exceeded pre-configurable counters. In this embodiment, the counters track the number of total AdXecutive messages Mike has received over a given timeframe for all brands and phone numbers called. This tracking ensures that Mike does not receive an over abundance of advertising messages in a short time period, which could lead to him opting out of all notifications in the future. If Mike has exceeded the allowable limit, the processing ends as outlined in stage 516. In some embodiments, this limit may be set by the user (Mike). In other embodiments, the limit may be set by a network administrator within the MNO or may be set by an advertising agency or company managing the platform and overall user experience. In an embodiment where Mike has not exceeded the predefined counter limits, an AdXecutive message is prepared by the platform and sent to the mobile subscriber at stage 520. The message sent could be a standard SMS, binary SMS, a class 2 SMS which will directly communication with a SIM (Subscriber Identity Module) card within the mobile subscriber's mobile device, an MMS message, a USSD message, or a web message sent over an IP (Internet Protocol) network. Processing on the calling party's device then ensues, as depicted in FIG. 6.

Figure 6:
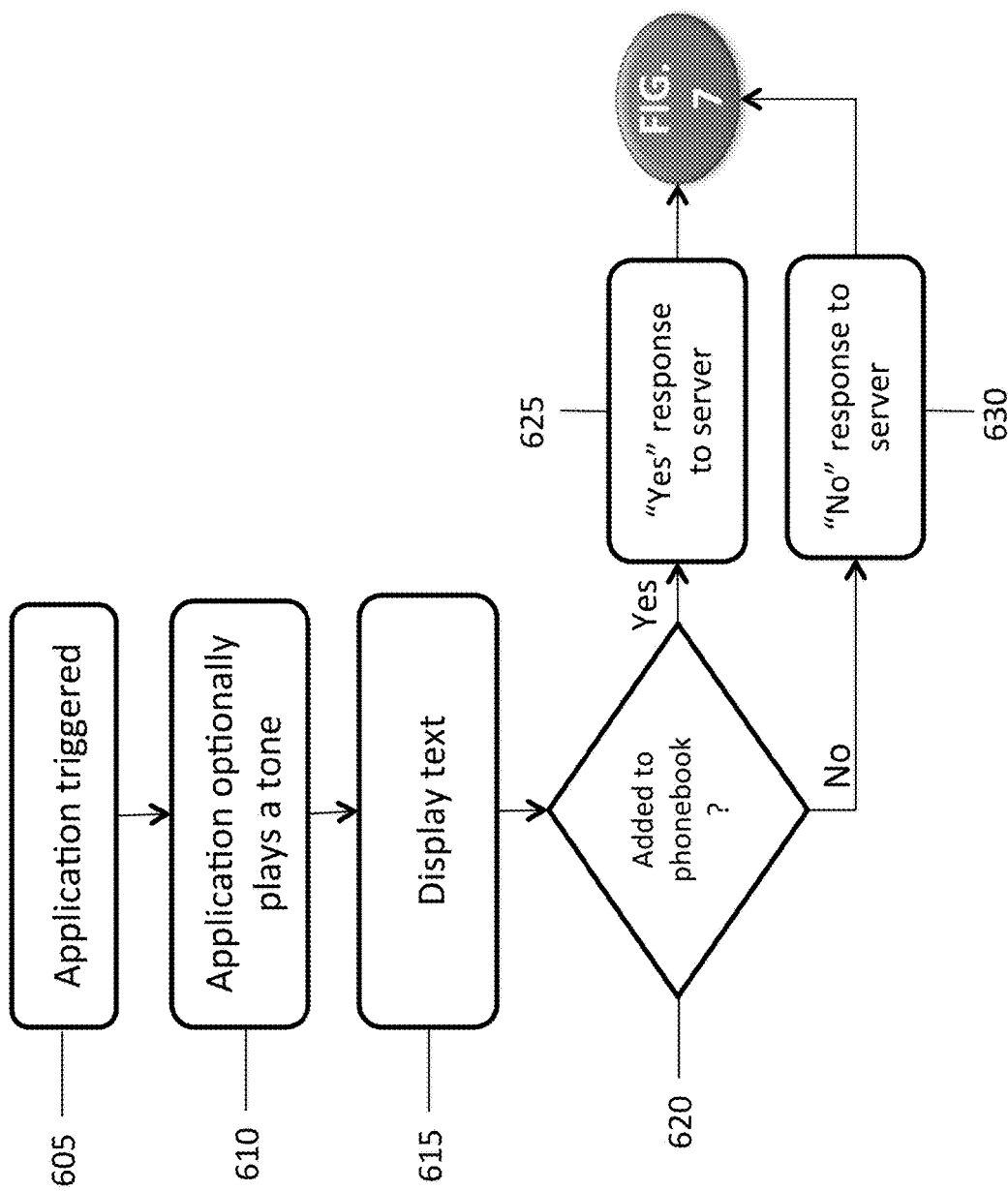
FIG. 6 is a flowchart illustrating the exemplary process of how the AdXecutive application is expressed and interacts with the user device, and thus the user experience.

FIG. 6 is a flowchart illustrating the exemplary process of how the AdXecutive application is expressed and interacts with the user device, and, thus, the user experience. In stage 605, the AdXecutive remote application is triggered on the mobile user's device. In some embodiments, the application may play a configurable tone as shown in stage 610. In some embodiments, this tone can be configured by the mobile user, or by the platform administrator. The tone can also be turned off for specific subscribers, for specific campaigns, or for certain device types. After the tone is processed and played, the campaign text is displayed to the calling party as shown in stage 615. The text shown to a mobile user is fully configurable and can contain letters, numbers, special characters and punctuation, or may contain UCS2 Unicode encoded characters such as Greek, Cyrillic, or Mandarin characters as an example. In this embodiment, Mike may see a message such as:

Thank you for calling Pizza Hut! Click OK to automatically save our phone number into your phonebook. Make is simple to order your next pizza with our number right at your finger tips. Saving our number is free!

In some embodiments, the message displayed in stage 615 will be actionable by the calling party, meaning Mike can make a decision as to whether or not he would like to save Pizza Hut's phone number into his mobile phonebook using the AdXecutive service. In stage 620, Mike makes the decision. If he decides to ignore the prompt, or if he selects "Cancel" or "No" as shown in Stage 620, he sees no further information and his "No" response is automatically sent back to the AdXecutive server in stage 630. If Mike decides to add Pizza Hut's phone number at stage 620 and selects "OK" or "Yes," his selection is sent back to the server platform in stage 625. Mike's MSISDN, and, optionally, the date and time or his response, the TAC (Type Allocation Code) of his device type, and/or a campaign ID associated with the Pizza Hut campaign are also sent back to the platform. In some embodiments, the phone number may be added to Mike's mobile phonebook at this stage as well. In other embodiments, further processing may take place as outlined in FIG. 7 in order to enhance the user experience.

Figure 7:
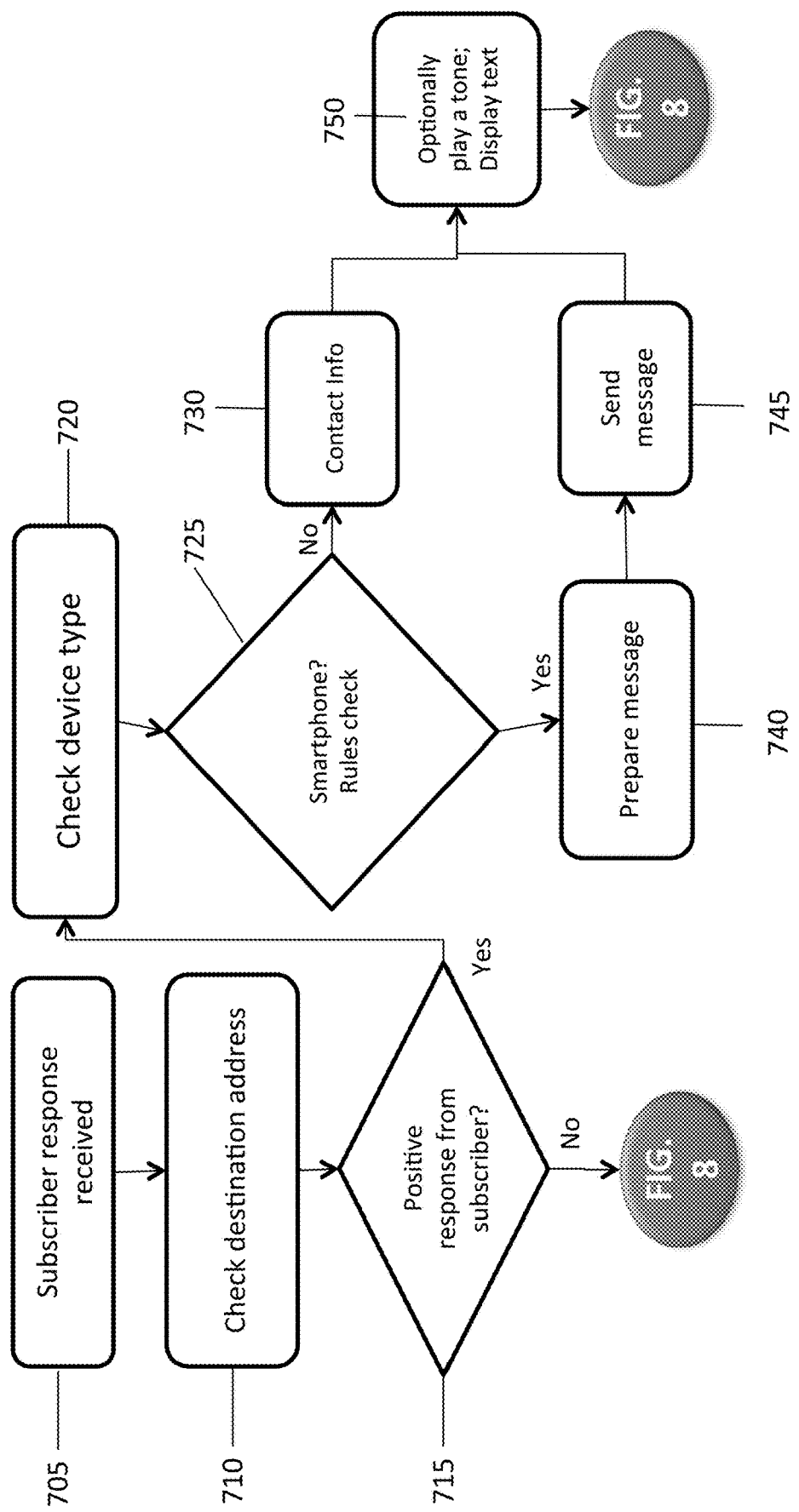
FIG. 7 is a flowchart illustrating the exemplary process of how the AdXecutive platform logs the mobile device user's response and determines the appropriate format for adding a phone number to a mobile user's phonebook, based on the user's device type.

FIG. 7 is a flowchart illustrating an exemplary embodiment of how the AdXecutive platform logs the mobile device user's response and determines the appropriate format for adding a phone number to a mobile user's phonebook, based on the user's device type. At stage 705, Mike's selected response to the advertising campaign is received at the AdXecutive platform. In stage 710, the server processes Mike's response. At stage 715, the server determines if Mike indicated a positive or negative response. If Mike did not wish to participate in the advertising campaign, meaning he did not want to save the information provided by Pizza Hut into his phonebook, the AdXecutive server logs his response for further analysis, as defined in the flows in FIG. 8. If Mike indicated he wanted the Pizza Hut information as indicated by an "OK" or "Yes" response, then the platform continues processing and checks Mike's device type in stage 720. The platform checks if Mike has a smartphone or other type of device that can receive a vCard, MMS, email, or other type of enhanced communication or enhanced business card/mobile phonebook contact entry. In the instance where Mike has such a device, then the platform prepares an appropriately formatted message (such as an 8 bit vCard, a text vCard, an MMS message, an MMS vCard message) as in stage 740. These are only examples and other specially formatted types could be sent in other embodiments. At stage 745, the message is sent to Mike's mobile device in an appropriate special format. At stage 750, the device may play a preconfigured alert tone. Mike receives a notification prompting him to add the Pizza Hut information into his phone book. In the embodiment where Mike has a feature phone, also considered a more basic device that does not recognize MMS vCards or other types of enhanced phonebook communications as outlined in Stage 725, then the contact information can be sent in either a standard SMS, or in a binary SMS format. In stage 730, the message is prepared for a basic feature phone and sent to the mobile subscriber. In the embodiment where a binary SMS is sent to the mobile device at stage 750, and the remote application on the device processes the message. The device will optionally play a tone and prompt the mobile subscriber with an actionable screen such as:

"Thanks for connecting with us at Pizza Hut! Click OK to confirm adding our contact information directly into your phonebook. You'll be able to call us, text us, an easily follow us on Facebook!"

In one embodiment, Mike can confirm that he would like the contact information added. In a different embodiment, the remote application can automatically add the Pizza Hut phone number directly into the phonebook silently, without any further interaction from Mike.

In some embodiments, follow-up messages may be sent in either standard SMS format or in a binary flash SMS format thanking the mobile user for adding the phone number into their phonebook. These messages may contain additional coupon codes or discount information, social media links, or other advertisement information promoting the brand or company. The platform can be configured to send these follow-up messages only to mobile users who agreed to add contact information into their phonebooks. The number of mobile users adding information drives revenues for Mobile Network Operators or platform administrators. Thus, subscriber choices and behaviors are tracked at both the remote application level and at the platform level, as illustrated in the flows in FIG. 8.

Figure 8:
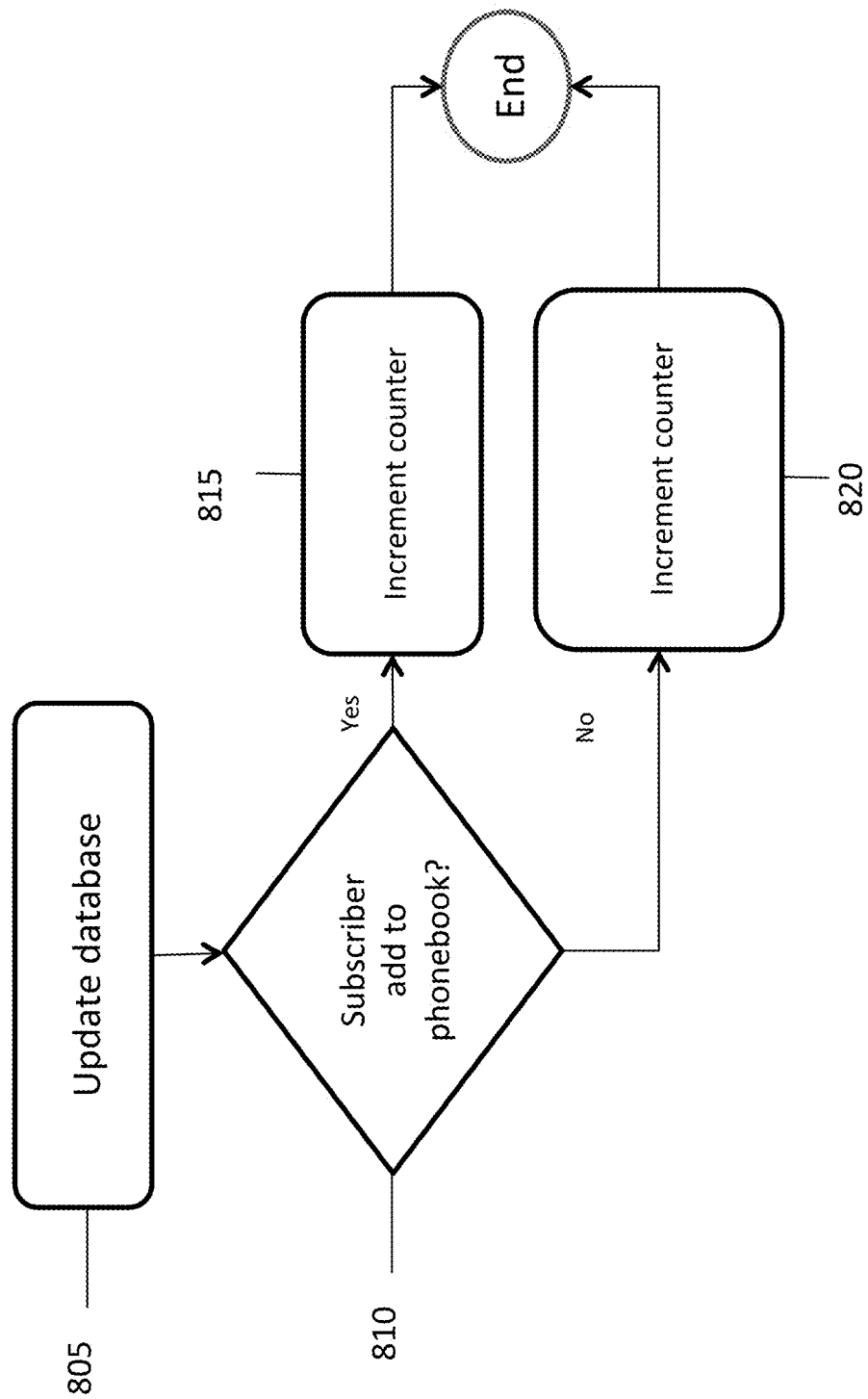
FIG. 8 is a flowchart illustrating the exemplary process of how the AdXecutive platform updates the database with subscriber preference results, tracking the participation such that the MNO may modify the frequency of campaign depending on subscriber responsiveness.

FIG. 8 is a flowchart illustrating an exemplary embodiment of how the AdXecutive platform updates the database with subscriber preference results, tracking the participation such that the MNO may modify the frequency of campaign depending on subscriber responsiveness. At stage 805, the AdXecutive server database is updated with the resulting user selection from a targeted mobile subscriber. The platform looks to determine if the mobile user responded in a positive or negative fashion at stage 810. In the instance where a mobile user chose to participate in the campaign, meaning that he selected "Yes" to add the called business's phone number into his phonebook, then the database counters for that particular MSISDN are updated at stage 815 such that the campaign will not trigger again if the phone number is dialed subsequent times. All counter settings and the number of times a particular campaign can be seen by a specific mobile user are all defined at the platform level and can be changed any time. In other embodiments, these settings can be managed by the subscriber and stored in within the remote application. In the embodiment where a subscriber chose not to participate, counters at the server platform are updated, as in stage 820. If the counter threshold is exceeded, the mobile user may not be targeted for future campaigns for any brand or company. In other embodiments, if counter thresholds are reached, the platform may send a message to the user that prompts the subscriber to opt-out of future notifications. This ensures that subscribers who never wish to participate in any advertising campaigns and who are not interested in adding any type of contact information into their phonebooks are not routinely targeted with campaigns that could lead to increased annoyance with their mobile service provider, or even a poor perception of the brand or company they had initially called.

Figure 9:
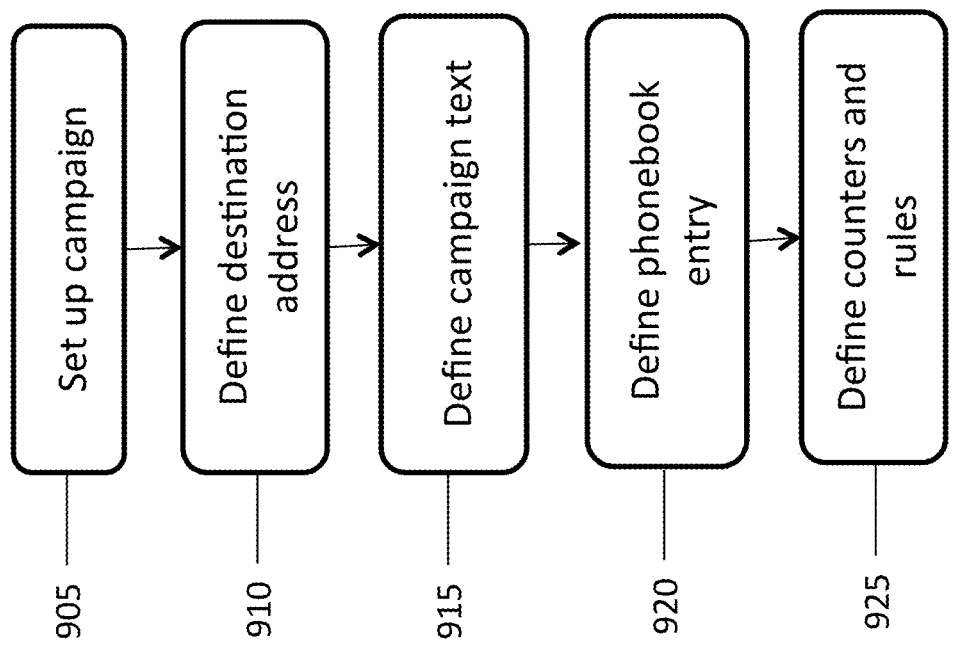
FIG. 9 is a flowchart illustrating the exemplary process of how an AdXecutive campaign is designed.

FIG. 9 is a flowchart illustrating the exemplary process of how an AdXecutive campaign is designed. At stage 905, the campaign is defined within the server. This includes the days and times during which the campaign will be relevant. In some embodiments, specific geographic regions can also be configured. In some embodiments, a maximum number of targeted mobile subscribers can also be set. At stage 910, any phone numbers called after which the campaign should trigger are defined. Next, during stage 915, the actual campaign text that will be shown to a calling party is defined. In stage 920, the information that will be sent to the mobile user to add into a mobile phonebook is defined. This information can include the business or brand name, the phone number or phone numbers, a website address, a physical address, social media sites such as Facebook, Twitter, Instagram, and Snapchat, and any other contact information or communication platform the company wishes to share with consumers in order to continue their extended outreach.

In stage 925, configurable counters and rules for the campaign are set. In one embodiment, this could include the number of times a specific unique mobile subscriber, as defined by his MSISDN, is prompted to add contact information into his phonebook after dialing a business phone number.

In other embodiments, the remote application can store target phone numbers for advertising campaigns. In this instance, the trigger phone numbers (such as Pizza Hut's phone number) are stored within the remote device application. There is no need for direct linkages between the MNO network and the AdXecutive platform.

In still another embodiment, the AdXecutive platform could be used to enhance a directory service. In this scenario, as outlined in FIG. 10, a mobile subscriber calls a directory service (such as "411"). The user requests information, which could include a phone number or physical address for a business or residence. In one embodiment, after the requested information is provided, the Directory Service asks the mobile user if he would like to add the phone number directly into his mobile phonebook. The user can respond either verbally or via a menu selection. The MNO network informs the AdXecutive platform that a specific MSISDN requires an AdXecutive campaign. The MSISDN, time, date, and phone number to be added to the mobile phonebook are all passed to the AdXecutive platform. A campaign is automatically triggered as outlined in FIGS. 5, 6, and 7.

In another embodiment, the AdXecutive platform formats messages such that the contact information is added directly into the mobile user's phonebook without any further prompting or interaction required from the user.

The invention claimed is:

1. A computer-implemented method for automatically sending a message to a mobile device connected to a Mobile Operator's network, the message being configured to display a request to add contact information of a business to a phonebook of the mobile device, the method comprising:
   receiving, at a server operably connected to a Mobile Operator's network, a first communication comprising an originating address associated with the mobile device, a destination address associated with a business, and an indication that a call from the originating address to the destination address has disconnected;
   preparing, at the server, a second communication comprising:
      a message comprising a request to add contact information of the business to the phonebook of the mobile device and an actionable response option configured to indicate acceptance of the request; and
      a command configured to instruct the mobile device to display the message on a screen of the mobile device;
   sending, from the server, the second communication to the mobile device via the originating address;
   receiving, at the server, a third communication comprising
      an indication that the actionable response option indicating acceptance of the request was selected on the mobile device, and
      the Type Allocation Code of the mobile device;
   preparing, at the server, a fourth communication comprising
      contact information of the business, and
      executable code, formatted according to the Type Allocation Code of the mobile device, configured to cause the contact information of the business to be added to a phonebook of the mobile device; and
   sending, from the sever, the fourth communication to the mobile device.

2. The method of claim 1, further comprising determining, at the server, whether the business has an existing advertising campaign.

3. The method of claim 1, further comprising determining, at the server, contact information of the business to be included in the fourth communication.

4. The method of claim 3, wherein the contact information comprises the destination address.

5. The method of claim 3, wherein the contact information comprises the name of the business, a web address, a street address, a social network ID, a photo, a logo, mapping coordinates, a second phone number, a fax number, an email address, a photo, a video, a description of a business, or a combination thereof.

6. The method of claim 1, wherein the second communication comprises executable code configured to launch an application on the mobile device.

7. The method of claim 6, wherein the fourth communication is configured to be processed by the application on the mobile device.

8. The method of claim 1, further comprising logging the actionable response option selected on the mobile device.

9. The method of claim 1, further comprising determining whether the originating address of the mobile device is on an opt-out list.

10. The method of claim 1, wherein the server is operably connected to a Mobile Network Operator's network via an Application Programming Interface, a billing platform of the Mobile Network Operator, or a home location registry (HLR) of the Mobile Network Operator.

11. The method of claim 1, wherein the first communication is received at the server from an Application Programming Interface.

\* \* \* \* \*